United States Patent Office.

P. H. VANDER WEYDE, M. D., OF PHILADELPHIA, PENNSYLVANIA.

*Letters Patent No. 74,175, dated February 4, 1868; antedated January 27, 1868.*

IMPROVED MODE OF PREPARING AERATED LIQUIDS.

*The Schedule referred to in these Letters Patent and making part of the same.*

TO ALL WHOM IT MAY CONCERN:

Be it known that I, P. H. VANDER WEYDE, of the city of Philadelphia, in the county of Philadelphia, in the State of Pennsylvania, have invented a new and useful Improvement in an Apparatus for the Spontaneous Preparation of all Beverages containing Carbonic Acid; and I do hereby declare that the following is a full and exact description thereof, drawings being superfluous therein to the right understanding.

The nature of my invention consists in two parts:

First. A simple coil in which the water is charged with carbonic acid; and

Secondly. The addition to the water thus charged of small quantities of concentrated solutions of the salts contained in mineral-waters, or extracts of beer, champagne, and other beverages of an effervescent nature.

A few practical objections to the preparation of the carbonic-acid beverages as thus far effected are avoided by my process. These objections are, that large quantities of ponderous water are now to be transported, which objection I overcome by simply transporting the light condensed gas alone, or manufacturing it at the spot where it is consumed. Next, that as many different vessels and fountains are required as there are diverse mineral-waters drawn, which I overcome in having the diverse saline solutions prepared beforehand, and concentrated to such a degree that a measured quantity of them, with a certain amount of carbonic-acid water, gives exactly the requisite strength of the mineral-water. Finally, beers and wines often become flat of taste when losing their carbonic acid; this is principally the case with those kinds, like lager beer, in which the carbonic acid is the principal palatable constituent. By my process there is always an abundance of this gas, as the concentrated extract of the substance is mixed with the effervescent carbonic-acid water.

By this invention it becomes possible to have always on hand fresh effervescent champagne, wine, all kinds of beer, mineral-waters, &c., by means of one simple carbonic-acid generator, and the addition of some small bottles containing the different extractive and alcoholic matter of those different drinks, made cool and palatable by the carbonic-acid water which they all naturally contain, and which is here only mixed with the concentrated extracts at the moment they are to be consumed.

The first part of the invention mentioned above, is a simple coil of tin pipe or tin-lined lead pipe laid in ice, and at its top connected with some permanent supply of water, either tank, city water-works, or otherwise, and is thus kept always filled. At the lower end of this coil is a pipe attached, through which a small jet of carbonic-acid gas is passed or injected, and by its ascent in the coil is absorbed by the descending water. At the upper part of the coil is an air-chamber to retain the remaining gas, which, after passing through the whole length of the coil, may not have been absorbed by the water. Proper stop-cocks, regulator, and safety-valve are provided for the admission and escape of the gas, admission and exit of the water, and retention of the gas-pressure.

This carbonic acid may be derived from one of my gas-generators with pressure, described in my patent granted January 30, 1867, No. 62,095, or it may be derived from some strong vessel containing the gas in a condensed or even liquefied condition.

The second part of the invention consists simply in a series of bottles or other appropriate vessels, with or without stop-cocks, each containing the strongly-condensed solution of salts of some mineral-water, as Spa, Kissingen, Pyrmont, Saratoga, &c., or the concentrated extracts of different beers, as ale, porter, lager, or wine, or champagne, or apple-extract for champagne cider, &c. These extracts are all concentrated to such a degree that half an ounce extract (tablespoonful) to eight ounces (tumbler) of carbonic-acid water, gives the usual degree of strength of the different beverages. The requisite small quantity of alcohol is also contained in the extract to make the mixture correspond with the beer, wine, &c., and also to cause the extract to keep for any length of time.

What I claim, and wish to secure by Letters Patent, is—

1. The described manner of dissolving the carbonic-acid gas in the water by means of coil, gas-jet, and reservoir with stop-cocks, regulator, and safety-valve, this solution being made at the place and time it is to be used as beverage.

2. Mixing carbonic-acid water with the required quantities of concentrated solutions of the salts contained in diverse mineral-waters, or the concentrated alcoholic extracts of beer, cider, wine, &c., and thus by only supplying one single fountain with so-called soda water, or even with pure water, to draw from it, at will, any desired mineral-water, beer, champagne, cider, or wine, and, in general, any beverage containing carbonic acid, always fresh and cool, and equally effervescent.

In witness whereof, I have signed my hand, this 25th of June, 1867, in presence of two witnesses.

P. H. VANDER WEYDE, M. D.

Witnesses:
   CHS. AUTENRIETH,
   T. W. LASSERRE.